United States Patent
Flandrena

[15] 3,645,592
[45] Feb. 29, 1972

[54] LUBRICANT CIRCULATING ANGULAR CONTACT BALL BEARING

[72] Inventor: William Kenneth Flandrena, Milwaukee, Wis.

[73] Assignee: General Motors Corporation, Detroit, Mich.

[22] Filed: Sept. 11, 1969

[21] Appl. No.: 857,125

[52] U.S. Cl. .................................308/187, 308/201
[51] Int. Cl. .................................F16c 33/66, F16c 33/38
[58] Field of Search .................................308/187, 201, 217

[56] References Cited

UNITED STATES PATENTS

| | | | |
|---|---|---|---|
| 1,915,287 | 6/1933 | Bott | 308/201 |
| 3,096,129 | 7/1963 | Hay | 308/201 |
| 3,494,291 | 2/1970 | Carter, Jr. | 308/201 |

Primary Examiner—Martin P. Schwadron
Assistant Examiner—Frank Susko
Attorney—Warren E. Finken and F. J. Fodale

[57] ABSTRACT

An angular contact bearing having a porous, permeable separator for lubricant circulation is disclosed. The separator includes a cylindrical surface which wipingly engages a cylindrical surface continuous with the raceway on the outer race. The lubricant circulation is from the cylindrical surface of the race through the porous separator to the balls; the balls in turn redistributing the lubricant back to the raceways and cylindrical surface.

1 Claim, 2 Drawing Figures

Patented Feb. 29, 1972

3,645,592

INVENTOR.
William K. Flandrena
BY
F. J. Fodale
ATTORNEY

LUBRICANT CIRCULATING ANGULAR CONTACT BALL BEARING

The invention herein described was made in the course of work under a contract or subcontract thereunder with the Department of Defense (Air Force).

My invention relates generally to an angular contact ball bearing and more specifically to an angular contact ball bearing which includes means for maintaining the bearing lightly lubricated by providing for the circulation of lubricant from lubricant surplus to lubricant depleted areas of the bearing.

In certain applications, such as for the spin axis of gyroscopes, it is important that the bearings have an extremely smooth, low torque operation. Likewise in such a use, there is usually subsequent inaccessibility requiring the inclusion of the entire life supply of lubricant into the bearing at the initial time of assembly. Consequently, while such a use requires the inclusion of this life supply of lubricant, at the same time the bearing must not be excessively lubricated because the high operational speeds and accuracy required of a gyroscope require smooth operating and hence the maintenance of a minimal surface film of lubricant on the bearing raceways and balls.

It is broadly the object of my invention to provide an improved angular contact ball bearing incorporating a mechanism for maintaining controlled bearing lubrication for an extended period of time.

Another object of my invention is to provide an angular contact ball bearing especially adapted for but not limited to use in a gyroscope in which a mechanism is provided to lightly lubricate the bearing and maintain this light lubrication of the bearing for an extended period of time.

Another object of my invention is to provide a ball bearing in which lubricant is circulated from excessively lubricated regions of the bearing to lubricant depleted areas of the bearing to maintain a light lubricant film on the balls and raceways of the bearing.

Another object of my invention is to provide an angular contact ball bearing in which the tendency to accumulate excess lubricant in the critical ball path region of the bearing has been eliminated thereby providing for smoother bearing operation.

Another object of my invention is to provide a ball bearing in which lubricant is recirculated in the bearing for longer and smoother operation and in which lubricant is filtered at a point during this recirculation.

Other objects and features of the invention will become apparent to those skilled in the art as the disclosure is made in the following detailed description of a preferred embodiment of the invention as illustrated in the accompanying sheet of drawing in which.

Figure 1:
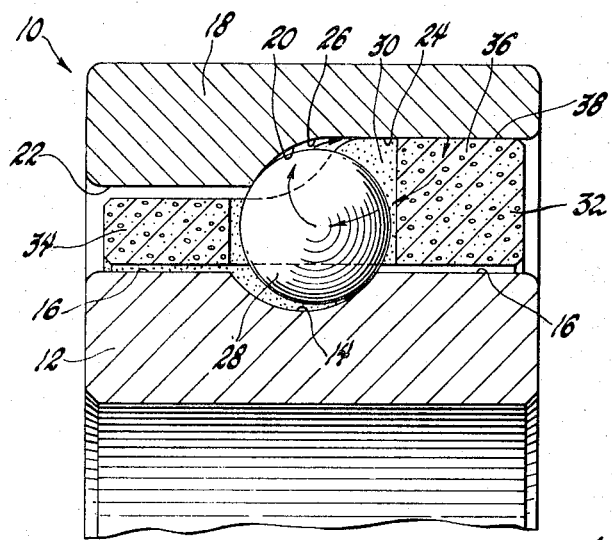
FIG. 1 is an axial section through a ball bearing in accordance with my invention.
Figure 2:
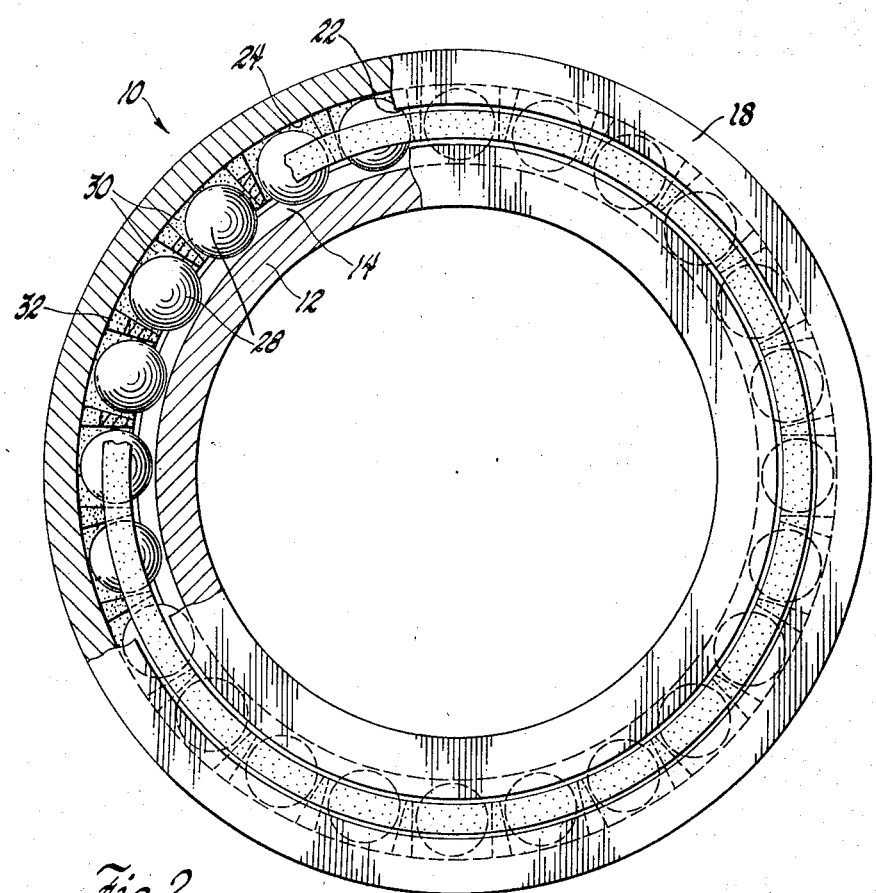
FIG. 2 is an end elevation of the ball bearing shown in FIG. 1 with the parts of the bearing broken away for clarity.

Referring now to the drawing, the ball bearing indicated generally at 10 includes an inner race 12 having a deep groove raceway 14 defined by the uninterrupted shoulders 16. The outer race 18 has a partially formed or half raceway 20 which is defined by the single thrust shoulder 22 at the left-hand side of the bearing as shown in FIG. 1. The opposite or right-hand side of the outer race has a cylindrical surface 24 which is continuous with the raceway 20 from its major diameter 26. Rollably engaging the raceways 14 and 20 is a complement of balls 28 which are disposed in the pockets 30 of the separator 32. The separator 32 has the normal end ring 34 on the left-hand side as viewed in FIG. 1, however, the right-hand end ring 36 and portion of the separator 32 is enlarged to form a cylindrical surface 38 which wipingly engages the cylindrical surface 24 on the outer race 18.

The separator 32 is porous and permeable at least from the cylindrical surface 38 to the inside of the ball pockets 30. The porous interstices are of such a size so as to produce a capillary action on any lubricant wiped from the surface 24 onto the surface 38 in order to perform a lubricant circulating function. At its initial installation, the porous separator 32 is impregnated with substantially a life supply of lubricant. In addition, a light film of this same lubricant may be applied to the steel surfaces of the bearing.

In operation regardless of which race is fixed, excess lubricant tends to accumulate in the outer raceway 20 at the major diameter 26. Capillary action draws the excess lubricant into the interface formed by the surfaces 24 and 38. As the separator 32 rotates relative to the outer race 18, it wipes this excess lubricant off the surface 24 and onto the surface 38 where capillary action wicks the excess lubricant through the separator to the inside surfaces of the ball pockets 30. The balls 28 rub against the surfaces of the pockets 30 picking up the lubricant and redistributing it to the raceways 14 and 20. Thus it can be seen that excess lubricant is constantly being removed and a thin film being maintained for smoother, life-long operation. It is to be noted that the tendency is for the excess lubricant to collect on the outer raceway 20 and to migrate toward the cylindrical surface 24 regardless of which race is rotating. In those instances where the inner race 12 is fixed and the outer race 22 is rotating, it will be appreciated that this collection and migration of excess lubricant is aided by centrifugal force. It is also to be noted that the constant removal of excess lubricant from the raceways eliminates the tendency to accumulate excess lubricant in the critical ball path region and thus provides for smoother bearing operation. It is also to be noted that the recirculation of the lubricant while maintaining a lightly lubricated bearing at all times also provides for lubricant filtration when the lubricant is delivered through the porous separator 32.

It is also to be noted that the bearing provides for the maintenance of the light lubrication for extended periods of time since any lubricant lost through operation of the bearing is replenished by the supply of lubricant initially provided by an impregnation of the porous separator 32.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

I claim:

1. A lubricant recirculating ball bearing comprising in combination,
    an inner race having a deep groove raceway with uninterrupted shoulders,
    an outer race having a second raceway with a single shoulder adjacent one side of said raceway, said opposite side being unshouldered and having a cylindrical surface continuous with said second raceway substantially from its maximum diameter,
    a separator having a plurality of ball pockets and made from a permeable material,
    a complement of balls disposed in said pockets and rollably engaging said raceways,
    said separator including a cylindrical surface wipingly engaging said cylindrical surface on said outer race, and
    capillary means in said separator extending from said cylindrical surface to said pockets whereby lubricant wiped from said cylindrical surface on said outer race by said separator is delivered to said balls through said separator, said capillary means comprising the pore interstices of the permeable material in said cage.

* * * * *